J. James,
Converting Motion.
Nº 31,606.    Patented Mar. 5, 1861.
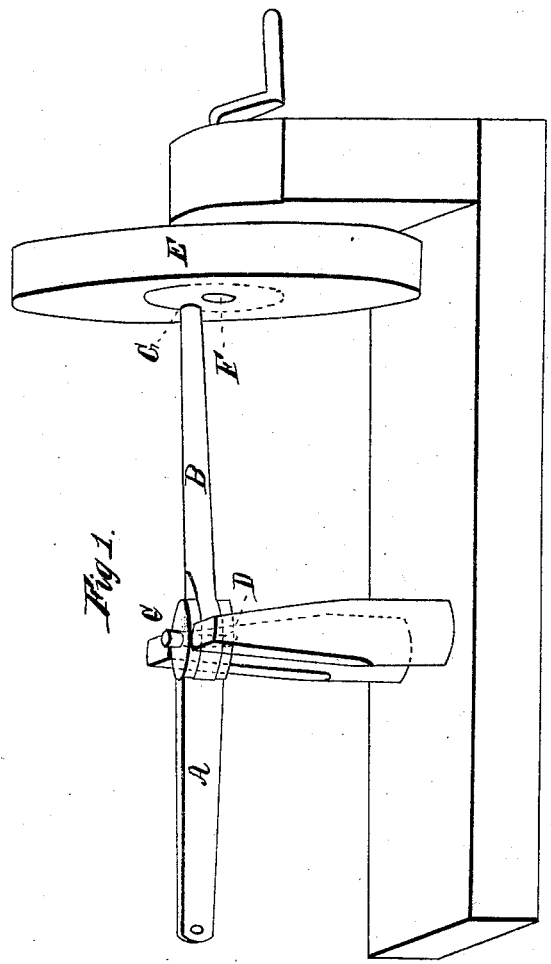
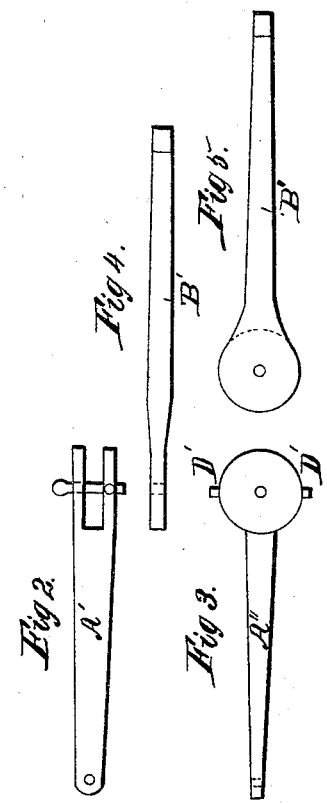
Witnesses.
J. H. Fairchild
Eleazer Millard Jr.
Inventor.
Josiah James.

UNITED STATES PATENT OFFICE.

JOSIAH JAMES, OF OGDENSBURG, NEW YORK.

MECHANICAL MOVEMENT.

Specification of Letters Patent No. 31,606, dated March 5, 1861.

*To all whom it may concern:*

Be it known that I, JOSIAH JAMES, of the village of Ogdensburg, in the county of St. Lawrence and State of New York, have invented a new and useful Improvement in Walking-Beams, being a Universal Joint in the Walking-Beam; and I do hereby declare that the following is a full, clear, and exact description of the construction and operation of the same, reference being had to the annexed drawings, and making a part of this specification, of which—

Figure 1 represents the walking beam complete with joint in the center; or place where the beam is poised by or on its supporters. Figs. 2 and 4 represent the different portions of the beam.

Letter A represents a section of the beam which contains the jaws or upper and lower portions of the joint—the same being more plainly shown in letter A′—and still another view of the same shown in A″. Letter B represents the lever or portion of the beam which contains the other portion of the joint, made so as to fit in the jaws of A′ and to correspond in shape with the portion of the joint shown in A″, as more clearly shown in B″.

C represents the pin through the center of the joint, and is the pivot on which the joint works or plays.

By cutting the opening which admits the lever B in the jaws in A′ deeper, and making corresponding holes to admit the pivot C′ through the joint in the lever—the leverage may be lengthened or shortened at pleasure, and the lever or beam removed or disconnected from the wheel E.

Letter D represents the gudgeons on which the beam is poised and may be placed upon the upper or lower jaws of A′.

The object of the joint is that the end of the walking beam B may be inserted in a balance wheel E and the said balance wheel be used either as the propelling power for the other section A of the beam or the reverse by having the power applied to section A for the purpose of driving the wheel E. For this purpose the center of the wheel E at the letter F must be on a line or parallel with the center of the bearing of the joint and the hole in the arm of the wheel at G to receive the end of the beam B must also be made so that it will point directly to the same center so that in revolving around F the wear and friction will be equal on all parts of the end of the beam inserted in the wheel. This may be accomplished by making the surface or arms of the wheel dishing, so that the plane or surface of that portion of the wheel where the beam is inserted will always be at right angles or perpendicular to the beam. The length of the stroke for the opposite end A of the beam may be increased or diminished at pleasure by having different holes made in the arm of the wheel E at greater or less distance from the center F.

I claim as my invention—

1. The joint in the walking beam as shown in Fig. 1 consisting of the jaws or upper and lower portions of joint as shown in A, A′, and A″—the end of the lever or other portion of the joints as shown in B, B′ and B″— together with the pin C.

2. This joint placed at the point where the walking beam is poised to give a compound or rotary motion to the end of the walking beam inserted in the fly or balance wheel E.

JOSIAH JAMES.

Witnesses:
DAN S. GRIFFIN,
TIMOTHY H. BROSNAN.